United States Patent [19]
Thompson

[11] 3,958,294
[45] May 25, 1976

[54] ROTARY SCRAPER

[75] Inventor: David E. Thompson, Norwalk, Conn.

[73] Assignee: The Thompson Tool Co., Inc., Norwalk, Conn.

[22] Filed: Aug. 23, 1974

[21] Appl. No.: 500,031

[52] U.S. Cl. .............................. 15/198; 15/93 R; 15/186; 15/187; 15/236 C
[51] Int. Cl.² ...................... A46D 9/02; A46D 13/00
[58] Field of Search ............................ 15/195–200, 15/179–187, 236; 134/6

[56] References Cited
UNITED STATES PATENTS
2,631,315 3/1953 Hauser.......................... 15/198 UX FOREIGN PATENTS OR APPLICATIONS
223,718 10/1924 United Kingdom................... 15/198

Primary Examiner—Peter Feldman
Attorney, Agent, or Firm—Robert L. Zink

[57] ABSTRACT

A rotary scraper with fingers striking the work surface at a lagging angle, thus removing material by impact rather than by a scraping action. By way of an example, a wire brush with pivoted fingers that are restrained and unable to fully centrifugally extend radially.

3 Claims, 4 Drawing Figures

ROTARY SCRAPER

BACKGROUND OF THE INVENTION

This invention is a rotary machine for treating work surfaces, the fingers impacting the work surface, the effects being to remove the surface finish, clean, polish, or anneal.

Wire brushes and the like provide strands that extend radially due to centrifugal force, and will gouge the work surface if care is not exercised. Because the strand strikes the surface at nearly a right angle, a shearing force is applied to the surface, removing the material at the tip of the strand irrespective of whether such removal is desired or not. Where the strand is made flexible or is composed of articulated links, the end of the strand removes material by frictionally scraping the surface, again with a possible gouging action.

Such machines do not fully take advantage of the physical characteristic differences between the material to be removed and the substratum. They rely either on an inferior shear bond between the two materials, or upon careful and continual visual inspection of extant material.

SUMMARY OF THE INVENTION

The object of the invention is to remove surface layers without tending to remove material from a differentiated base substratum. Examples are the removal of paint, of welding scale, of metallic plating or oxides, of tooth placque, etc. It is a further object of my invention to treat surface layers with controlled impact without abrading such layers, such as in a peening and annealing process. It is yet a further object of my invention to remove surface layers from a substratum softer than the surface layer without abrading the substratum. My invention accomplishes these objects by providing a multitude of fingers about a rotatable shaft, wherein each finger is pivotable either about the shaft center, or about its own center spaced radially away from the shaft surface on a hub. Normally, in such an arrangement the rotating shaft would cause the fingers to extend centrifugally as radial rays. In my invention, however, the fingers are prevented from so fully extending, making it impossible for the tip of the finger to strike the work surface at a right angle. The limit on the rotation of the finger may be accomplished by mechanical stops or by a fixed relationship to the hub of the machine, whereby the rotation of the finger is limited by the limits of flexibility of the finger material.

In all cases, the finger is unable to strike the surface except at an angle, the finger therefore striking the surface at a point lagging the travel of the scraper is moved transaxially to its shaft along the work surface. This prevents the finger from digging into the surface. Flexibility of the finger additionally prevents the gouging of the surface. The total effect is one of striking the material to be removed so as to loosen it, the material then being lifted off by the unflexing of the finger as the pressure is relieved by the travel of the scraper.

Where the work surface is of a single material, a polishing effect will result since negligible material will be removed. The angle of impingement, and thus the adjustment of the impacting and lifting effect, can be controlled either by the location of the aforementioned stops, or by a curvature of the finger that decreases its angle of impact with the horizontal. Flexibility of the finger may be governed by the material design of the finger, or in the case of a material such as music wire, the number of loose wraps the wire makes around its rotary center before being fixed. Additionally, the wire, when deflected, will either tighten or loosen the wraps, depending upon whether the wrap is in an angular direction co-dimensional with the striking deflection (tightening) or reversal (loosening).

As the tip strikes the work surface, it rebounds away. By varying two parameters (shaft rotational speed and finger flexibility), the finger can be caused to rebound during operation to its stop position, elastically overtravel, and then return, freely striking the work surface more than once. This multiple impingement increases the flicking action at the work surface.

The increased removal effect resulting from the simple arithmetic increase in blows is compounded by the increased impact against the surface due to the elastic rebound from the stop position plus the opportunity to restrike the surface before the substratum recovers from a first harmonic deflection.

DETAILED DESCRIPTION

Figure 1:
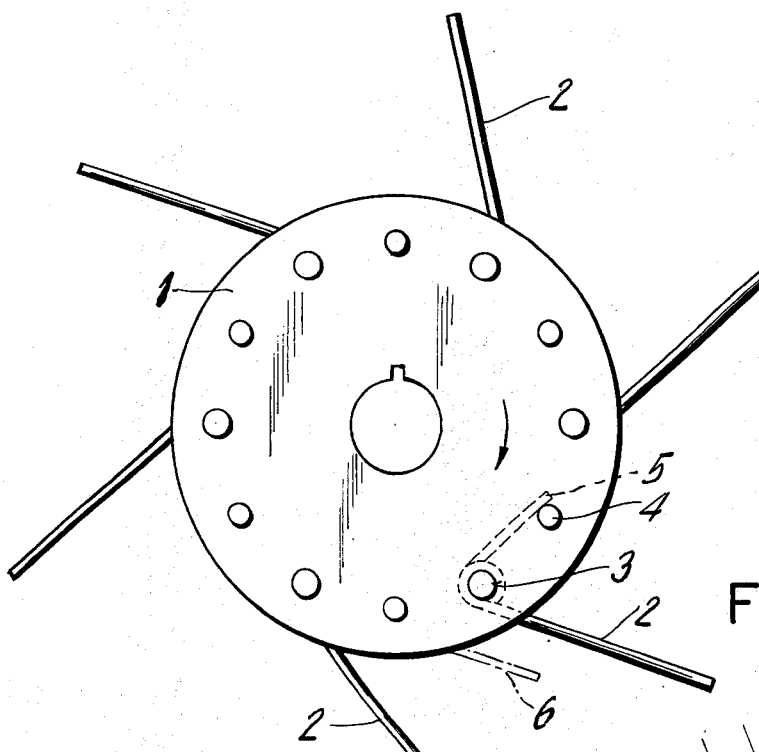
FIG. 1 is a view of the scraper showing the normal operating position.
Figure 2:
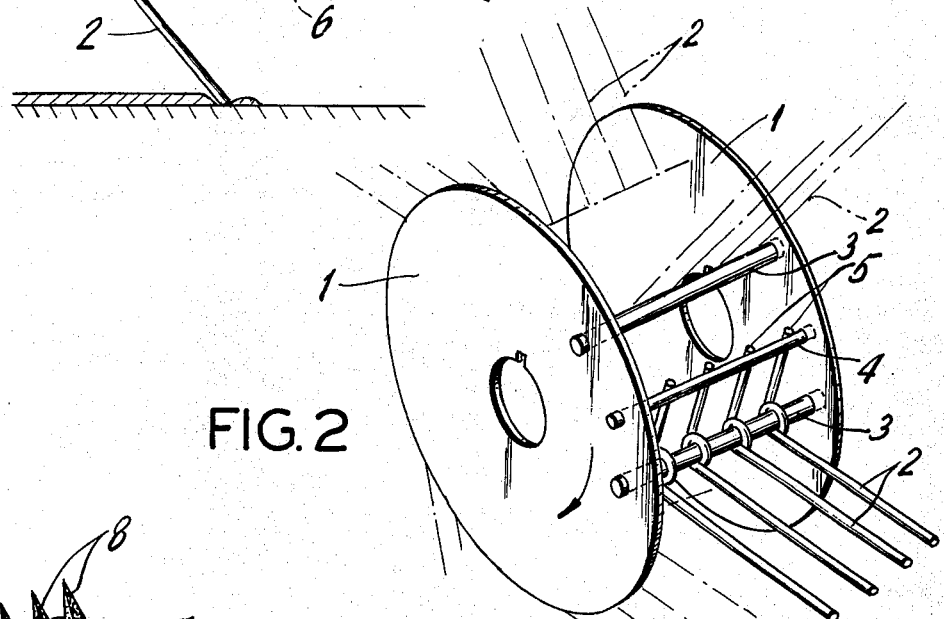
FIG. 2 is a perspective view of the scraper illustrating the parts.

A scraper made of hub plates 1 connected by pivot shafts 3 and by restraining shafts 4 bears wire fingers 2 wound about its pivot shafts 3. The inside end 5 of the wire finger is limited in arcuate travel by the restraining shafts 4. The fingers are shown in their fully extended position. Each finger is free to pivot to a position, for example 6 wherein the outer tip is closer to the hub center.

Figure 3:
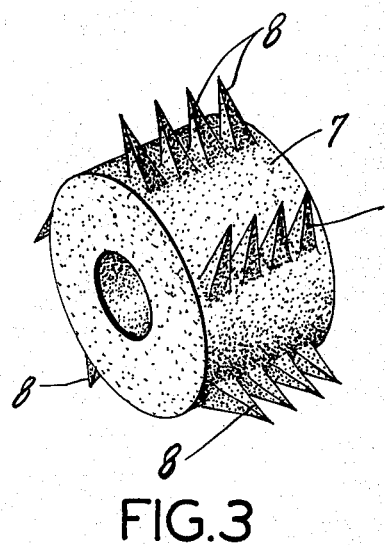
FIG. 3 is a perspective view of an elastomer embodiment of the invention.
Figure 4:
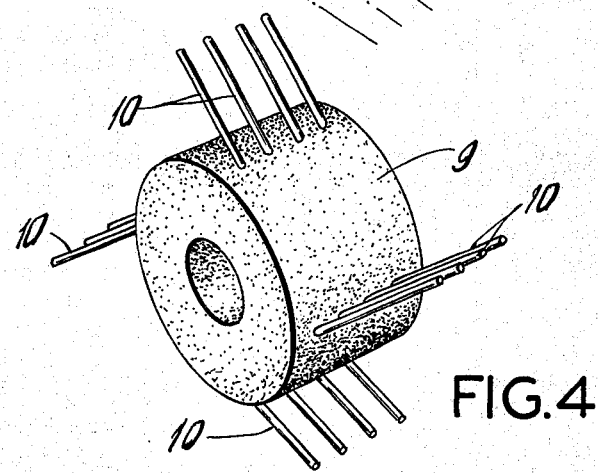
FIG. 4 is a view showing a combination elastomer hub and semi-rigid fingers.

FIG. 3 illustrates another embodiment of the invention with an elastomer hub 7 and contiguous elastomer fingers 8. FIG. 4 illustrates yet another embodiment of the invention using an elastomer hub 9 bearing imbedded wire fingers 10.

I claim:
1. A rotary scraper comprising
   a. a hub
   b. a plurality of elastically flexible fingers pivotably attached to the hub extending outwardly therefrom
   c. restraining means fixed to the hub and located adjacent said pivotably attached fingers in a direction opposite to the direction of rotation, said restraining means including means integral with said fingers and resting on said restraining means for preventing a true radial extension of the fingers from the hub
   wherein a rotation of the hub about its central axis proximate to a work surface causes the outward tips of the fingers to flexibly impinge the work surface at a point substantially removed from the projection of the hub axis onto the work surface.

2. The scraper of claim 1 wherein the fingers are comprised of spring wire connected to the hub by winding the hub end of the finger around a pivot shaft and wherein the restraining means limits the rotation of the finger about the pivot shaft by limiting the motion of the free end of the winding.

3. The scraper of claim 1 wherein an elastic restoring force of the flexed finger displaces work surface cle- ments loosened by the impingment.

* * * * *